United States Patent [19]

Yaeger

[11] 4,077,706
[45] Mar. 7, 1978

[54] PROJECTING KALEIDOSCOPE

[76] Inventor: Marshall J. Yaeger, 20 W. 64th St., New York, N.Y. 10023

[21] Appl. No.: 746,597

[22] Filed: Dec. 1, 1976

[51] Int. Cl.² .............................................. G03B 21/00
[52] U.S. Cl. ................................................................ 353/1
[58] Field of Search ......................... 353/1, 2; 350/4, 5

[56] References Cited

U.S. PATENT DOCUMENTS

| 1,577,388 | 3/1926 | Twyman | 353/1 |
| 3,030,856 | 4/1962 | Jordan | 353/1 |

FOREIGN PATENT DOCUMENTS 443,080  12/1948  Italy ......................................... 353/2

Primary Examiner—Richard E. Aegerter
Assistant Examiner—John W. Shepperd
Attorney, Agent, or Firm—Jacobs & Jacobs

[57] ABSTRACT

A projecting kaleidoscope comprises two V-shaped mirror troughs arranged downstream of a transparent or translucent design through which light is projected. The projected light travels by means of lenses along an optical path through the design and thence through the two V-shaped mirror troughs.

7 Claims, 7 Drawing Figures

PROJECTING KALEIDOSCOPE

The present invention relates to a projecting kaleidoscope. In particular, the present invention relates to a kaleidoscope of the type in which a continuously changing kaleidoscopic image is projected on a surface for viewing.

The kaleidoscope was devised in 1817 by Sir David Brewster and comprises a V-shaped mirror trough consisting of two long narrow mirrors placed lengthwise in a tube with the mirrored surfaces facing each other. The user peers through an opening at one end of the tube and sees a plurality of symmetrically arranged images that can be changed by rotation of the tube to rearrange bits of colored glass held in place at the other end of the tube. A projecting kaleidoscope employs the same principle, but projects light through a transparent or translucent design and thence through a mirror trough to a lens that collects the image and projects it onto a surface for viewing. Representative of old and new projecting kaleidoscopes can be seen in U.S. Pat. Nos. 1,690,584 and 3,030,856.

While the two-dimensional images projected through conventional projecting kaleidoscopes can often be quite pleasing, nevertheless there is much room for improvement. Efforts to obtain more sophisticated images usually result in overly complicated, and hence esthetically unpleasing, images or, as will be explained in more detail below, the overly complex images actually are resolved by the eye into relatively simpler ones.

The projecting kaleidoscope of the present invention represents a substantial advance in the art and is capable of projecting a highly complex and sophisticated representation of a three-dimensional image, that is the interior surface of a dome, which is of enhanced esthetic appeal. This is accomplished by the projecting kaleidoscope of the present invention, which comprises a housing, projecting lamp means in said housing, means for supporting a design adjacent said lamp means for projection of light therethrough, first and second V-shaped, elongated mirror trough means in said housing, each trough means having a pair of light-reflecting surfaces facing toward each other, and lens means for providing an optical path from said lamp means through said design and thence through said first and second mirror trough means.

The present invention is illustrated by the accompanying drawings, in which:

FIG. 1 is a schematic view in section of the projecting kaleidoscope of the invention;

FIGS. 2 and 3 are each views in section along lines 2—2 and 3—3, respectively, of FIG. 1;

Figure 1:
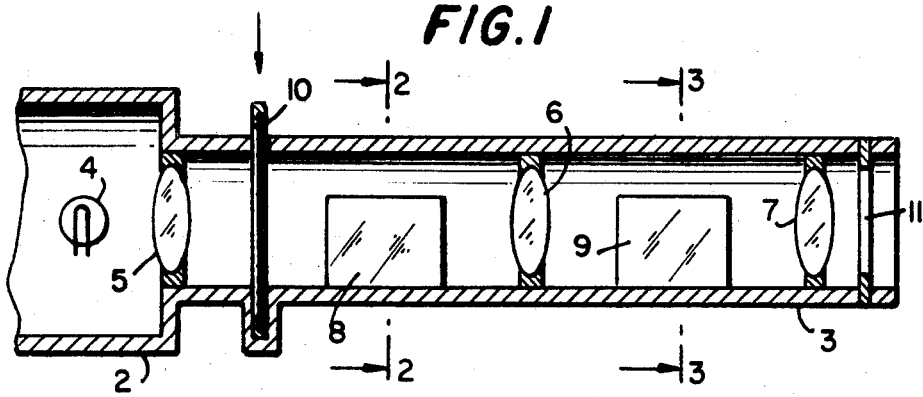

FIG. 1 shows a projecting kaleidoscope 1 according to my invention, having a housing 2 and a tube 3 projecting therefrom. Within housing 2 is a lamp 4 and within tube 3 are lenses 5, 6 and 7 and V-shaped mirrored troughs 8 and 9. A transparent or translucent slide 10 having a design thereon is inserted in tube 3 and held in place by means not shown. Light from lamp 4 is projected through lens 5 and thence through slide 10 so as to project the image of the design on slide 10 through mirrored trough 8. Lens 6 collects the image from mirrored trough 8 and projects it through mirrored trough 9. The final image is collected by lens 7 and is projected out of the tube through mask 11 having a desired aperture, preferably circular, and onto a projection screen (not shown) or other surface. Slide 10 may be moved during the projection, e.g. by sliding slide 10 vertically, to present a continuously changing pattern. Alternatively, slide 10 may carry a plurality of designs that are sequentially passed in front of lens 5.

Lenses 5, 6 and 7 are shown schematically only. Either single lenses, combinations of lenses or lens systems may be used.

Figure 2:
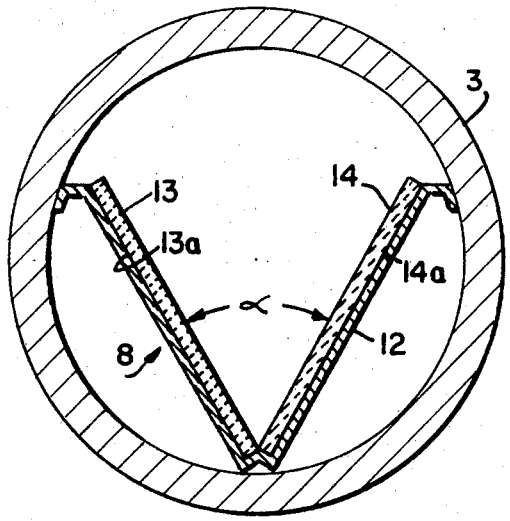
Figure 3:
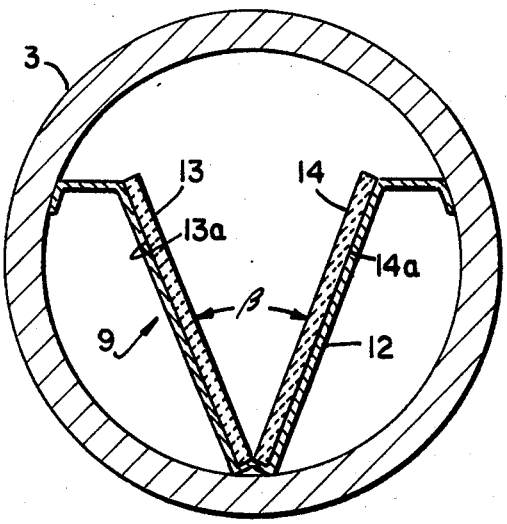

Mirrored troughs 8 and 9 are conventional mirrored troughs used in kaleidoscopes. As shown in FIGS. 2 and 3, troughs 8 and 9 comprise a support 12 mounted on the inner wall of tube 3 and a pair of mirrors 13 and 14 disposed with their mirrored surfaces 13a and 14a facing toward the center of tube 3. The mirrors 13 and 14 are at an angle $\alpha$ for trough 8 and an angle $\beta$ for trough 9. If desired, troughs 8 and 9 may be provided with adjusting means (not shown) for changing angle $\alpha$ and-/or $\beta$, or troughs 8 and 9 will be pre-set as shown.

Figure 4:
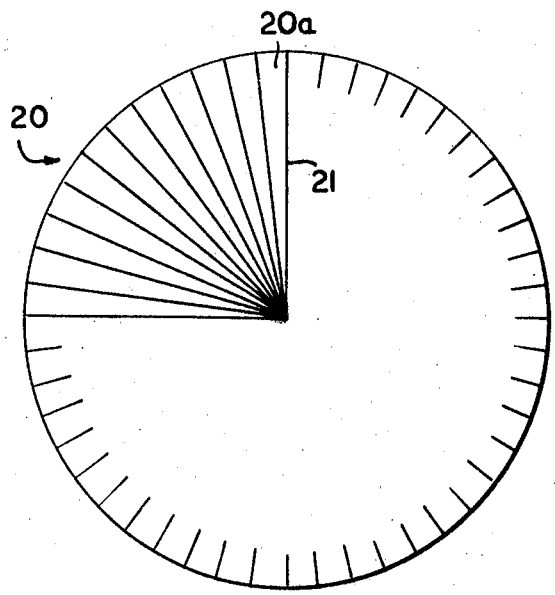
FIG. 4 is a 48-part pattern as obtained by a conventional projecting kaleidoscope.

A conventional projecting kaleidoscope employs a single V-shaped mirrored trough. A design projected through the single trough emerges as a pattern repeated $360/\theta$ times, where $\theta$ is the number of degrees of the included angle between the mirrors of the mirrored trough. Hence, a design projected through a single mirrored trough where $\theta$ is 7.5° appear, as shown in FIG. 4, as a circular pattern 20 having 48 sectors 20a defined by radii 21. While perhaps interesting for many purposes, a two-dimensional pattern 20 of the type obtained by conventional kaleidoscopes tends to become simplified or resolved by the human eye into much less than the $360/\theta$ sections. Thus, design features lying on either side of a line 21 of pattern 20 are mirror images and will fuse together, thus halving the visual complexity of pattern 20. For example, the design shown in FIG. 3 of U.S. Pat. No. 1,667,278 appears to the eye as a 5-pointed star surrounded by five crowns, i.e. a 5-section design, but it is actually a 10-section design produced by a single trough where $\theta$ is 36°.

Figure 5:
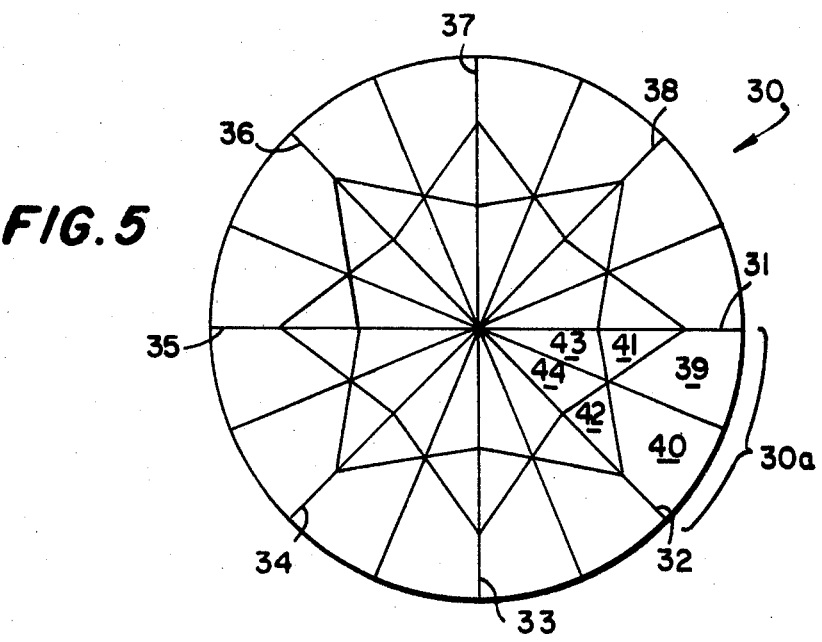
FIG. 5 is a 48-part pattern obtained by the projecting kaleidoscope of the present invention.
Figure 6:
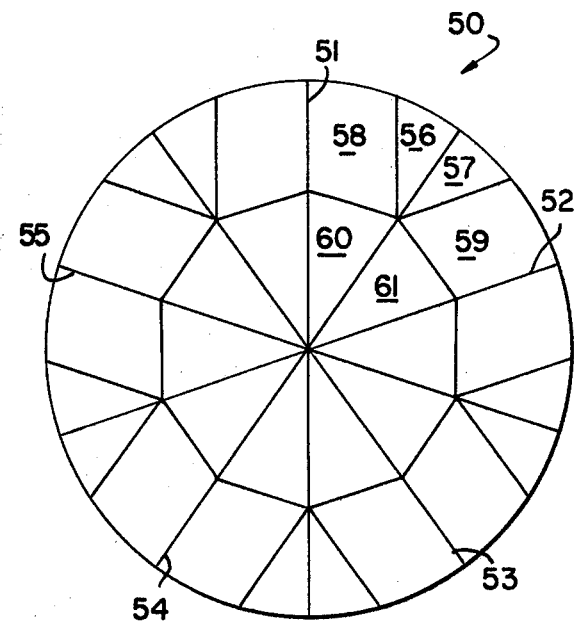
FIGS. 6 and 7 are each 30-part patterns produced by the projecting kaleidoscope of the present invention.
Figure 7:
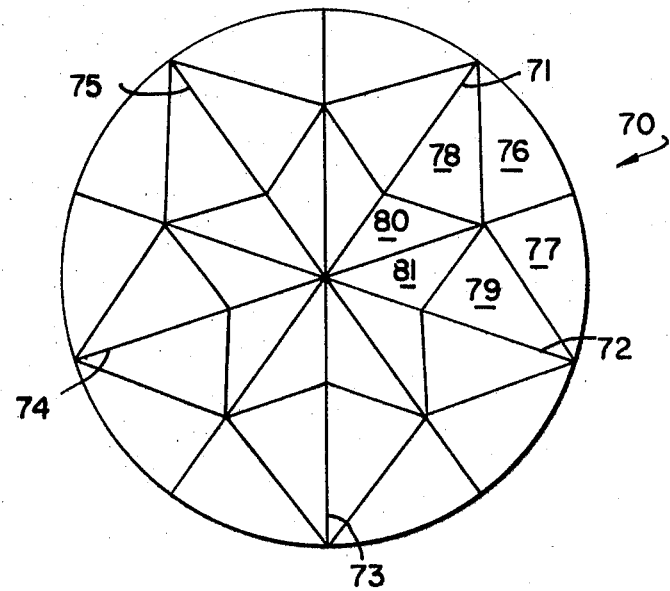

The kaleidoscope of the present invention projects radically different representations of three-dimensional patterns, as illustrated in FIGS. 5, 6 and 7.

FIG. 5 shows a pattern 30 obtained through the kaleidoscope of the invention, consisting of 8 wedge-shaped sections defined by radii 31–38, each section containing 6 smaller portions or sub-divisions. Thus, section 30a consists of portions 39–44. What is seen is a pattern 30 consisting of 48 parts, but pattern 30 is remarkably more interesting and complex than the 48-part pattern shown in FIG. 4. Moreover, since the 48 parts of pattern 30 are not all congruent, it is not possible for the eye as readily to reduce the complexity of pattern 30, as is the case for pattern 20. Indeed, pattern 30 is actually a montage of an 8-section or sector pattern formed by radii 31–38 and produced by setting angle $\beta$ of trough 9 at 45° and a 6-section pattern of portions 39–44 within each section produced by setting angle $\beta$ of trough 8 at 60°, with both troughs 8 and 9 facing upwardly as shown. To generalize then, for those cases where $m$ is an even number, the present invention permits the obtaining of a pattern having $m \cdot n$ parts, where $m = 360/\alpha$ and $n = 360/\beta$, wherein $n$ is the number of sections or sectors, $m$ is the number of subdivisions or portions within each section or sector and α and β are the included angles (in degrees) of troughs 8 and 9.

It is quite surprising that the use of the lenses 5, 6 and 7 are mirrored troughs 8 and 9 give rise to a pattern 30 consisting of a representation of the interior of a dome formed by a montage of two separate patterns, rather than, as shown in FIG. 4, a single pattern of $m \cdot n$ congruent sections or sectors. As can be seen from FIGS. 5-7, the patterns obtained through the kaleidoscope of the invention are of considerable sophistication.

FIGS. 6 and 7 illustrate patterns obtained when $m$ is an odd number. In patterns 50 and 70, α and β were each 72°. In pattern 50, troughs 8 and 9 both open upwardly, whereas in pattern 70, trough 8 opens upwardly and trough 9 downwardly. In pattern 50, there are 5 sections or sectors, defined by lines 51-55, each section having 6 portions 56-61, thus giving rise to a 30-part pattern. Similarly, lines 71-75 form 5-sections or sectors, each section having 6 portions 76-81. Patterns 50 and 60 are also each a montage of 2 multi-part patterns, namely a montage of a 5-sector pattern formed by radii 51-55 and 71-75, respectively, and a 6-section pattern of portions 56-61 and 76-81, respectively, within each of the sectors. As in the case of pattern 30, patterns 50 and 60 cannot be as readily resolved by the eye into half or less of its complexity.

FIGS. 6 and 7 illustrate the interesting phenomenon when $m$ is odd. Since α was 72°, it would have been predicted that each sector of FIGS. 6 and 7 would contain 5 sub-divisions, but in actuality there are 6. This emphasizes the empirical nature of the invention, and the formula for the number of parts for a pattern where $m$ is odd would be $(m + 1)(n)$.

In constructing the projecting kaleidoscope 1, the lenses 5, 6 and 7 and troughs 8 and 9 must be related one to the other such that a single pattern emerges consisting of $m$ portions within each of $n$ sections or sectors of a circle, and this can be determined empirically by moving the lenses and troughs within tube 3 until the proper relationship is obtained so that lens 6 can collect and project the virtual image from trough 8 through trough 9 and lens 7 can collect and project the virtual image from trough 9 out of tube 3.

The patterns shown in FIGS. 5, 6 and 7 can be viewed as a three-dimensional mandala, the mandala being a pattern common to all forms of religious mysticism. This aspect of the apparatus suggests many meditational and mystical usages to which my invention can be applied.

What is claimed is:

1. A projecting kaleidoscope, comprising:
   a. a housing;
   b. projecting lamp means in said housing;
   c. means for supporting a design adjacent said lamp means for projection of light therethrough;
   d. first and second V-shaped, elongated mirror trough means in said housing and spaced from one another, each trough means having a pair of light-reflecting surfaces facing toward each other; and
   e. optical means for providing an optical path from said lamp means through said design and thence through said first and second mirror trough means, said optical means comprising a first lens means adjacent said lamp means and said design supporting means, a second lens means between said first and second mirror trough means and a third lens means after said second mirror trough means.

2. The kaleidoscope according to claim 1, wherein said first and second mirror trough means are in the same attitude with reference to the optical path.

3. The kaleidoscope according to claim 1, wherein said first and second mirror trough means are disposed at an angle of 180° with respect to one another with reference to the optical path.

4. The kaleidoscope according to claim 1, wherein the included angles between the pair of reflective surfaces of the mirror trough means are identical.

5. The kaleidoscope according to claim 1, wherein the included angles between the pair of reflective surfaces of the mirror trough means are different.

6. The kaleidoscope according to claim 1, wherein the first and second mirror trough means are in the same attitude with respect to one another with reference to the optical path, the included angle between the reflective surfaces of the mirror trough means closest to the lamp means being 60° and the included angle between the reflective surfaces of the other mirror trough means being 45°.

7. The kaleidoscope according to claim 1, wherein said supporting means supports a design for movement relative to the housing and means is provided for moving said design.

* * * * *